United States Patent

Brooks, Jr. et al.

[11] Patent Number: 6,087,620
[45] Date of Patent: *Jul. 11, 2000

[54] METHOD OF FABRICATING A COMPOSITE ACTUATOR ARM ASSEMBLY

[75] Inventors: William Woodrow Brooks, Jr., Rochester; Lowell James Berg, Minnetonka; Jerome Thomas Coffey, Rochester; Brian Edwin Schultz, Minneapolis, all of Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/100,912

[22] Filed: Jun. 19, 1998

Related U.S. Application Data

[62] Division of application No. 08/877,754, Jun. 17, 1997, Pat. No. 5,835,311, which is a continuation of application No. 08/478,279, Jun. 7, 1995, abandoned.

[51] Int. Cl.[7] ................................. B23K 26/22
[52] U.S. Cl. ................... 219/121.64; 29/603.03
[58] Field of Search ............... 219/106, 121.64; 360/104; 29/603.03, 603.06

[56] References Cited

U.S. PATENT DOCUMENTS

| | | | |
|---|---|---|---|
| 4,023,005 | 5/1977 | Bolin | 219/121.64 |
| 4,665,298 | 5/1987 | Rocca | 219/121.6 |
| 4,819,094 | 4/1989 | Oberg . | |
| 4,991,045 | 2/1991 | Oberg . | |
| 4,994,931 | 2/1991 | Foote . | |
| 5,027,241 | 6/1991 | Hatch et al. | 360/104 X |
| 5,172,286 | 12/1992 | Jurgenson | 360/104 |
| 5,187,625 | 2/1993 | Blaeser et al. . | |
| 5,201,458 | 4/1993 | Hagen . | |
| 5,208,712 | 5/1993 | Hatch et al. . | |
| 5,237,472 | 8/1993 | Morehouse et al. . | |
| 5,245,489 | 9/1993 | Kimura et al. . | |
| 5,291,360 | 3/1994 | Foote . | |
| 5,299,081 | 3/1994 | Hatch et al. . | |
| 5,313,355 | 5/1994 | Hagen . | |
| 5,343,345 | 8/1994 | Gilovich | 360/104 |
| 5,408,372 | 4/1995 | Karam, II . | |
| 5,440,437 | 8/1995 | Sanada et al. . | |
| 5,512,725 | 4/1996 | Kelemen et al. | 219/121.64 |
| 5,550,694 | 8/1996 | Hyde | 360/104 |

FOREIGN PATENT DOCUMENTS

| | | |
|---|---|---|
| 0 583 797 A1 | 2/1994 | European Pat. Off. . |
| 63-100611 | 5/1988 | Japan . |
| 3-207588 | 9/1991 | Japan . |
| 3-256281 | 11/1991 | Japan . |
| 3-278382 | 12/1991 | Japan . |
| 4-147784 | 5/1992 | Japan . |
| WO 92/05542 | 4/1992 | WIPO . |

*Primary Examiner*—Gregory Mills
*Attorney, Agent, or Firm*—Tyler L. Nasiedlak; Mark A. Hollingsworth

[57] ABSTRACT

A shock-resistant actuator assembly for use in a data storage system is disclosed. The actuator assembly includes an actuator body, fabricated from a first type of metal, having a central aperture for pivoting on an actuator shaft. The actuator body includes at least one composite actuator arm extending outwardly from the actuator body. The composite actuator arm includes a primary arm member, also fabricated from the first type of metal, and a plating of a second type of metal having a thickness of at least 20 microns disposed on an upper and lower surface of the primary arm member. In one embodiment, the primary arm member is fabricated from aluminum and subjected to an electroless nickel plating process to deposit a sufficient thickness of nickel thereon to appreciably increase the stiffness of the primary arm member. In another embodiment, an actuator comb assembly includes a plurality of integral composite actuator arms for supporting a plurality of head suspension assemblies. The relatively thick plating of metal deposited on the primary arm member substantially enhances the stiffness and shock resistance of the composite actuator arm.

23 Claims, 9 Drawing Sheets

METHOD OF FABRICATING A COMPOSITE ACTUATOR ARM ASSEMBLY

This application is a Divisional of application Ser. No. 08/877,754, filed Jun. 17, 1997 now U.S. Pat. No. 5,835,311 which is a continuation of application Ser. No. 08/478,279, filed Jun. 7, 1995 (now abandoned) which applications are incorporated herein by reference.

FIELD OF THE INVENTION

The present invention relates generally to data storage systems, and, more particularly, to a shock-resistant actuator assembly for use in a data storage system.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator assembly and passed over the surface of the rapidly rotating disks.

A conventional actuator assembly typically includes a plurality of outwardly extending arms onto which at least one head suspension assembly (HSA) is mounted at the extreme end of the arms. A typical HSA includes a load beam configured for mounting to the end of an actuator arm and a slider assembly onto which one or more read/write transducers are mounted. Airflow produced above and below the respective surfaces of the rapidly rotating disks results in the production of an air bearing upon which the aerodynamic slider is supported, thus causing the slider to fly a short distance above the rotating disk surface.

An actuator assembly configured to include a plurality of such outwardly extending arms is often termed an actuator comb. In operation, the actuator arms are interleaved into and out of the stack of rotating disks, typically by means of a coil assembly mounted to the actuator. The coil assembly generally interacts with a permanent magnet structure, and the application of current to the coil in one polarity causes the actuator arms and sliders to shift in one direction, while current of the opposite polarity shifts the actuator arms and sliders in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers which are shifted from track to track, typically under the control of a data storage system controller. The transducer assembly typically includes a read element and a write element. Other transducer assembly configurations incorporate a single transducer element used to read and write data to and from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field, or flux lines, emanating from the magnetized locations of the disk. As the read element passes over the rotating disk surface, the interaction between the read element and the magnetized locations on the disk surface results in the production of an electrical signal, often termed a readback signal, in the read element.

A trend has developed in the data storage system manufacturing community to miniaturize the chassis or housing of a data storage system to a size suitable for incorporation into miniature personal computers, such as notebook and pocket-sized computers, for example. Various industry standards have emerged that specify the external housing dimensions of small and very small form factor data storage systems. One such recognized family of industry standards is the PCMCIA (Personal Computer Memory Card Industry Association) family of standards, which specifies both the dimensions for the data storage system housing and the protocol for communicating control and data signals between the data storage system and a host computer system coupled thereto.

Recently, four families or types of PCMCIA device specifications have emerged. By way of example, a Type-I PCMCIA device must be fully contained within a housing having a maximum height dimension of 3.3 millimeters (mm). By way of further example, a Type-II PCMCIA device housing must not exceed a maximum height of 5.0 mm. A maximum height of 10.5 mm is specified for the housing of Type-III PCMCIA devices, and Type-IV devices are characterized as having a maximum housing height dimension in excess of 10.5 mm. It is anticipated that the industry trend toward continued miniaturization of data storage systems will eventually result in the production of systems complying with the Type-II PCMCIA specification. Such Type-II PCMCIA data storage systems will likely have external housing dimensions of approximately 54 mm×86 mm×5 mm, and include a data storage disk having a diameter of approximately 45 mm and a width dimension similar to that of a standard credit card.

It can be appreciated that a reduction in the housing dimensions of a data storage system necessarily results in a concomitant reduction in the size of the data storage disks disposed therein. It would appear desirable to increase the number of data storage disks disposed within the data storage system to provide for an increase in data storage capacity. This alternative, however, necessitates a reduction in axial spacing between adjacently stacked data storage disks which, in turn, necessitates a reduction in the thickness of the outwardly extending arms of the actuator assembly in order to accommodate the smaller disk-to-disk spacing. Although the thickness of the actuator arms must be reduced, the length of the actuator arms, however, must remain unchanged, thereby resulting in actuator arms having reduced stiffness characteristics.

The mechanical stiffness of an elongated actuator arm is generally a function of the arm's section modulus, configuration, and the material used to fabricate the arm, among other factors. It is generally considered critical that an actuator arm be sufficiently stiff in order to resist detrimental levels of bending or deflection which, in turn, can result in catastrophic contact between the actuator arm and the sensitive surface of a data storage disk. In particular, an actuator arm must generally be designed to resist detrimental levels of deflection in the presence of high-magnitude, short-duration, non-operational shock vibrations, in addition to resisting normal levels of deflection resulting from normal data storage system operation. It is noted that the packaging constraints imposed on the manufacturer's of compact data storage systems generally preclude employment of a conventional shock attenuation apparatus, thereby making such compact systems particularly susceptible to high-magnitude, short-duration shock vibrations.

It is well-understood that an elongated actuator arm becomes increasingly susceptible to such detrimental short-duration shock vibrations as its sectional modulus and, therefore, its stiffness is reduced. In addition to undesirable deflection characteristics, actuator arms having reduced stiffness are difficult to handle during actuator assembly fabrication. An actuator assembly that satisfactorily passes inspection after the actuator build process may subsequently be irreparably damaged by mis-handling the actuator assembly during installation into a data storage system. In order to increase the stiffness of actuator arms having reduced sectional moduli, it has been suggested that materials other than conventionally used materials be used in the fabrication of an actuator assembly. Such suggested alternative materials include ceramics, beryllium, beryllium alloys, and various other exotic alloys and composites. Although one or more of these suggested materials may appear to be suitable alternatives, none of these can be used to produce data storage system actuator assemblies in a cost-effective, high-yield manufacturing environment.

There exists in the data storage system manufacturing industry a keenly felt need to provide a shock-resistant actuator assembly suitable for use in systems having reduced disk-to-disk clearance specifications. There exists a further need for such an actuator assembly that can be reliably manufactured using conventional processes and at a relatively low-cost. The present invention fulfills these and other needs.

SUMMARY OF THE INVENTION

The present invention is a shock-resistant actuator assembly for use in a data storage system. The actuator assembly includes an actuator body, fabricated from a first type of metal, having a central aperture for pivoting on an actuator shaft. The actuator body includes at least one composite actuator arm extending outwardly from the actuator body. The composite actuator arm includes a primary arm member, also fabricated from the first type of metal, and a plating of a second type of metal having a thickness of at least 20 microns disposed on an upper and lower surface of the primary arm member. In one embodiment, the primary arm member is fabricated from aluminum and subjected to an electroless nickel plating process to deposit a sufficient thickness of nickel thereon to appreciably increase the stiffness of the primary arm member. In another embodiment, an actuator comb assembly includes a plurality of integral composite actuator arms for supporting a plurality of head suspension assemblies. The relatively thick plating of metal deposited on the primary arm member substantially enhances the stiffness and shock resistance of the composite actuator arm.

DETAILED DESCRIPTION OF THE PREFERRED EMBODIMENTS

Figure 1:
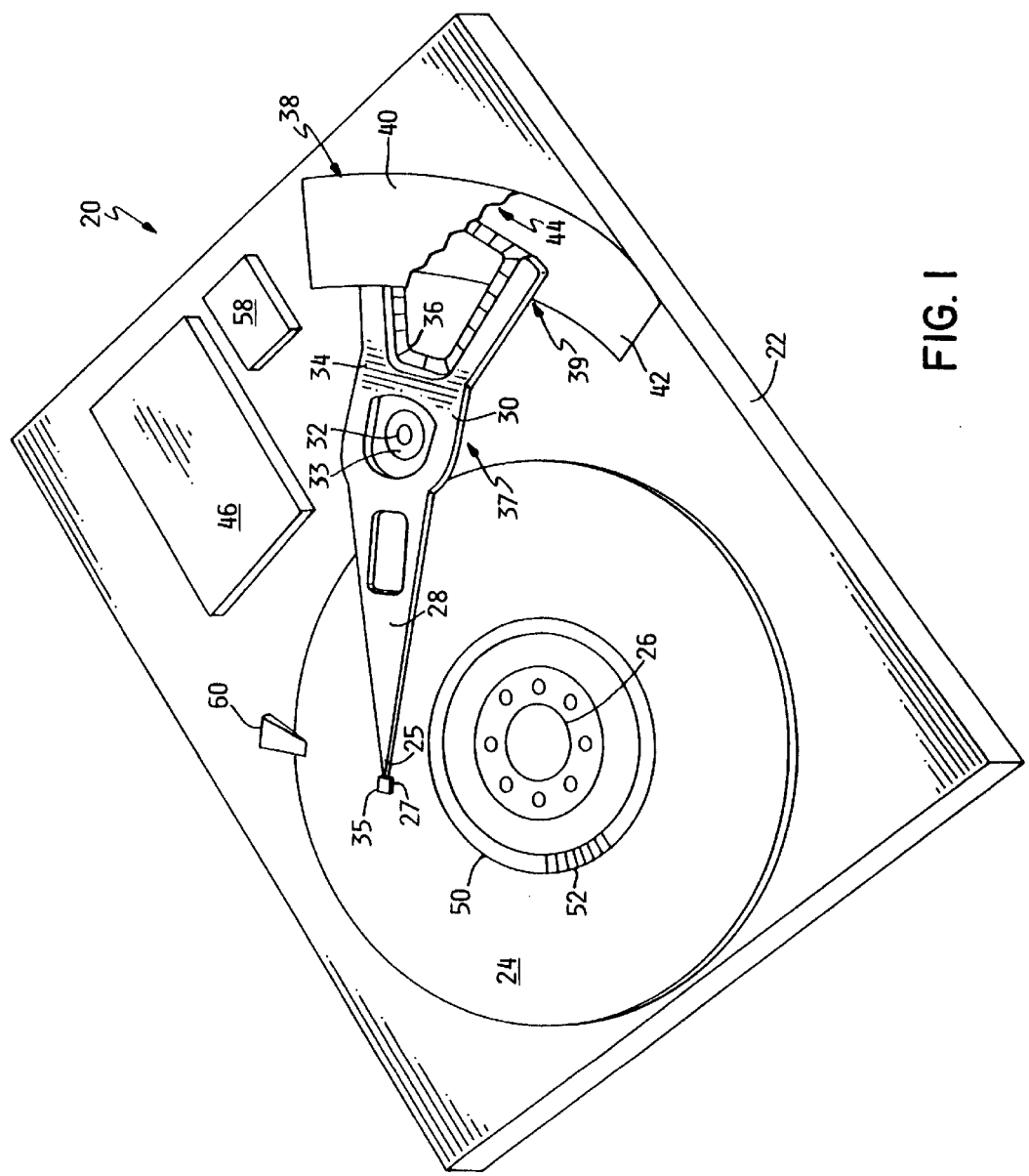
FIG. 1 is a top perspective view of a data storage system with its upper housing cover removed.
Figure 2:
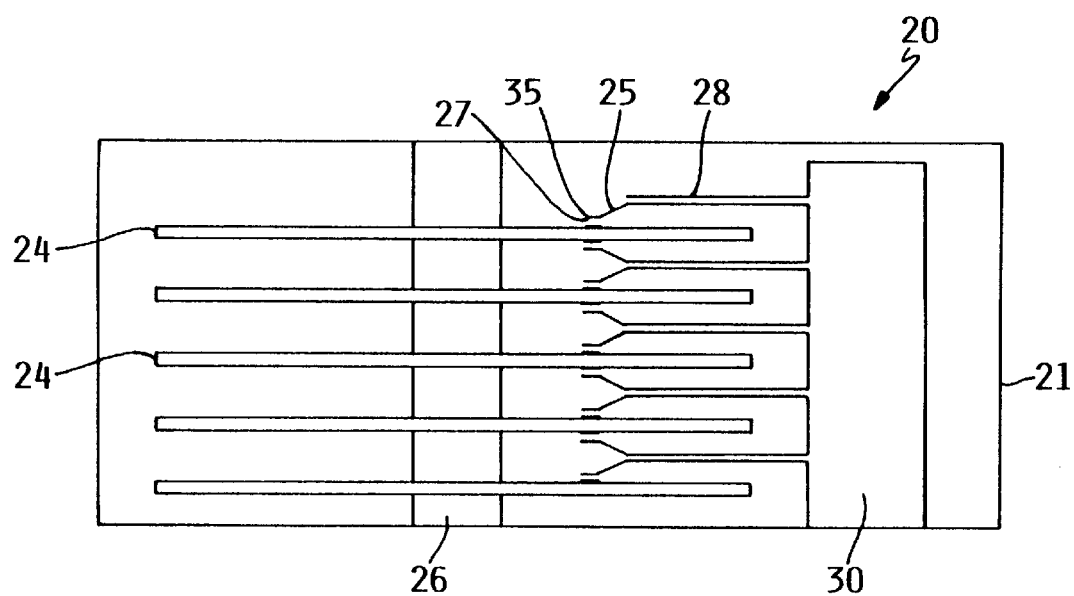
FIG. 2 is a side plan view of a data storage system comprising a plurality of data storage disks.

Referring now to the drawings, and more particularly to FIG. 1, there is shown a data storage system 20 with the cover 23 removed from the base 22 of the housing 21. A data storage system 20, as shown in FIG. 2, typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiralled track configuration.

An actuator 30 typically includes a plurality of interleaved actuator arms 28, with each arm having one or more transducer 27 and slider 35 assemblies mounted to a load beam 25 for reading and writing information to and from the data storage disks 24. The slider 35 is typically designed as an aerodynamic lifting body that lifts the transducer 27 off of the surface of the disk 24 as the rate of spindle motor 26 rotation increases, and causes the transducer 27 to hover above the disk 24 on an air bearing produced by high-speed rotation of the disk 24. A conformal lubricant may alternatively be disposed on the disk surface 24 to reduce static and dynamic friction between a constant contact-type slider 35 and disk surface 24.

The actuator 30 is usually mounted to a stationary actuator shaft 32, and rotates on the shaft to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surface of the data storage disks 24. The spindle motor 26 typically comprises an a.c. motor or, alternatively, a poly-phase brushless d.c. motor, energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a controller 58. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 in directions dependent on the polarity of the control currents flowing in the coil assembly 36. A controller 58 preferably includes control circuity that coordinates the transfer of data to and from the data storage disks 24, and cooperates with the actuator voice coil motor 39 to move the actuator arms 28 and transducers 27 to prescribed track 50 and sector 52 locations when reading and writing data to and from the disks 24.

Figure 3:
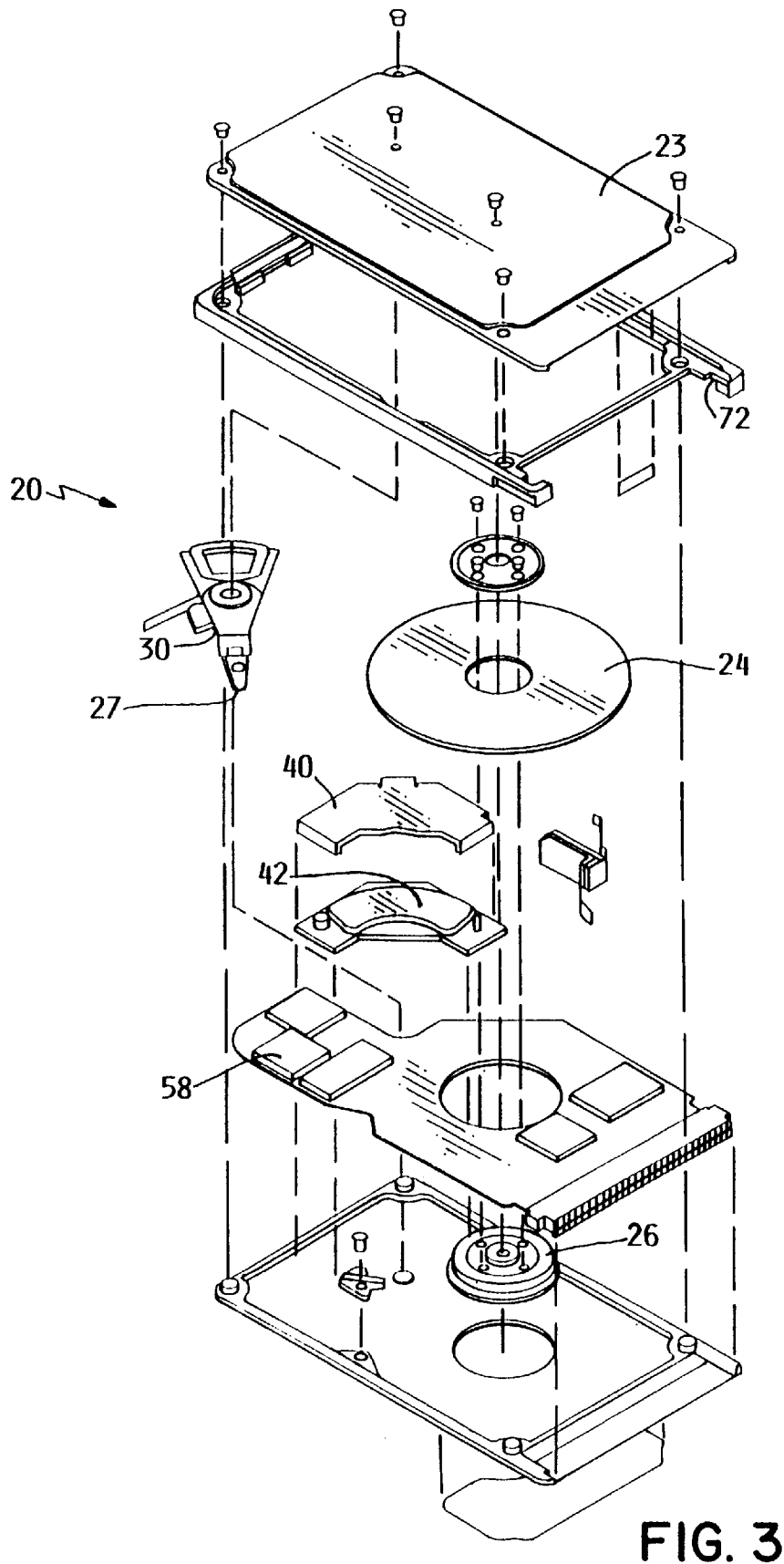
FIG. 3 is a perspective view of a data storage system having a relatively small form factor.

Referring to FIG. 3, there is illustrated a data storage system 20 having a relatively small form factor, and having housing 21 dimensions generally conforming to one of the PCMCIA housing specifications previously discussed. The compact packaging configuration of small and very small form factor data storage systems 20 typically provides for only minimal separation distances and tolerances between adjacently mounted system components. The vertical or height dimension for a PCMCIA Type-II housing, for example, is specified as being 5 mm. Accordingly, the stiffness characteristics of the outwardly extending actuator arms 28 of an actuator comb assembly 30 become of paramount importance as the disk-to-disk spacing is reduced to accommodate the reduction in data storage system housing dimensions. Actuator arm 28 stiffness is also of critical importance in standard data storage systems having an increased number of data storage disks 24 and reduced disk-to-disk spacing dimensions.

Figure 4:
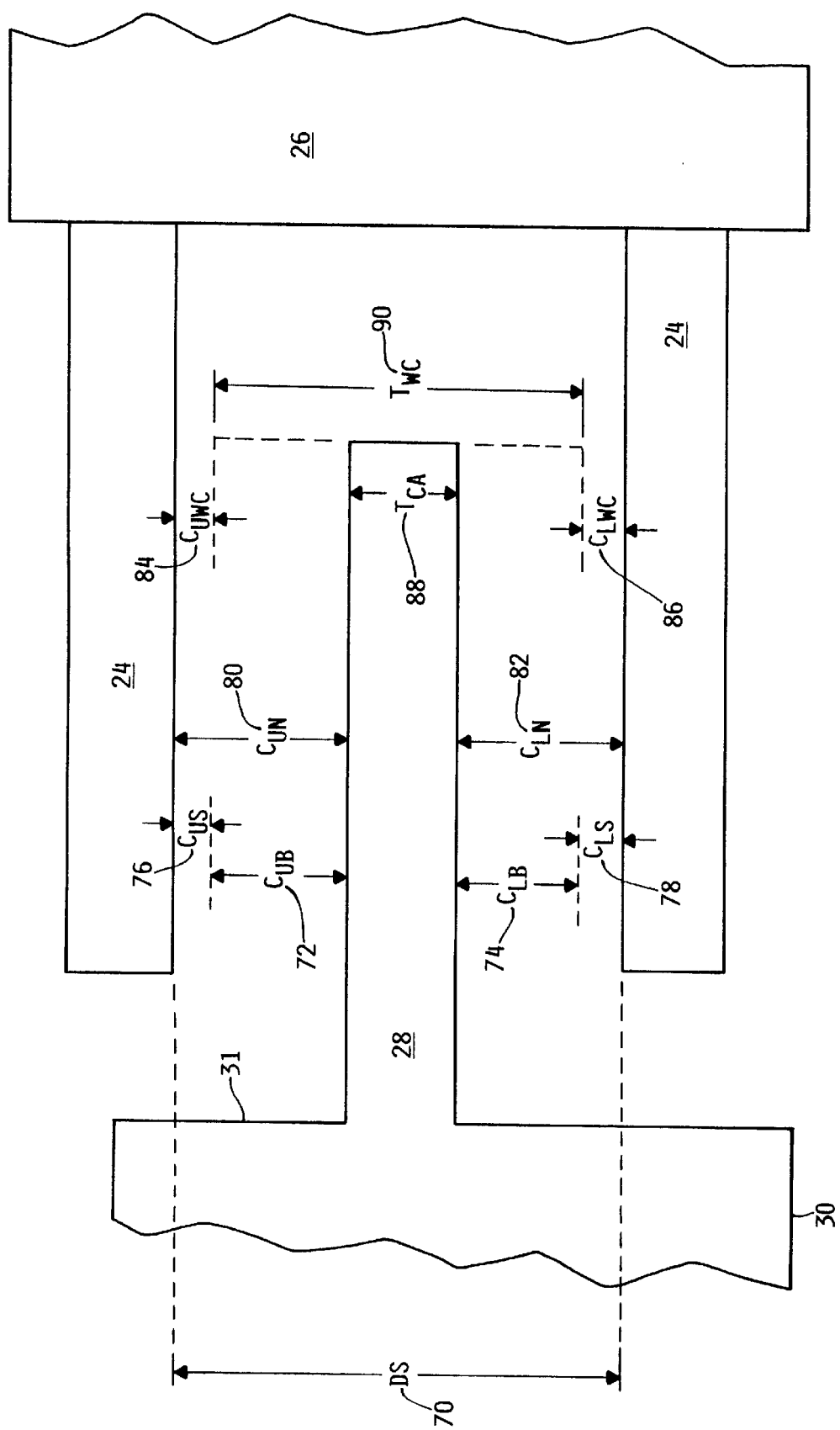
FIG. 4 is an exaggerated partial sectional side view of an actuator arm shown between two adjacently stacked data storage disks, and various spacial dimensions associated with the cooperative operation of the actuator assembly and data storage disk stack.

Turning now to FIG. 4, there is illustrated an exaggerated depiction of an actuator 30 situated in a cooperative relationship with respect to two adjacently stacked data storage disks 24 mounted on the hub of a spindle motor 26. It is to be understood that the dimensions of the actuator 30 with respect to the data storage disks 24 are exaggerated for illustrative purposes and to clearly depict various critical dimensions which significantly impact the performance of an actuator comb 30 when operating in cooperation with a plurality of coaxially stacked data storage disks 24.

As previously discussed hereinabove, it is generally desirable to increase the number of data storage disks 24 disposed in a data storage system 20 for the purpose of increasing the data storing capacity of the system 20. The continuing trend toward increased storage capacities has been addressed in one solution by reducing the nominal disk-to-disk spacing DS 70 between two adjacently stacked data storage disks 24, within which an elongated actuator arm 28 pivots when writing and reading information to and from the disks 24. In response to reduced disk-to-disk spacing dimensions 70, an actuator arm 28 having a significantly reduced cross-sectional thickness must be employed, while continuing to provide sufficient rigidity to resist operational and non-operational shock loads.

Referring to FIG. 4 in greater detail, an actuator arm 28 having a thickness $T_{CA}$ 88 is depicted as operating within a disk-to-disk spacing DS 70 defined axially between the upper and lower surfaces of two adjacently stacked data storage disks 24. As illustrated, a nominal upper arm clearance $C_{UN}$ 80 is defined between the actuator arm 28 and an upper data storage disk 24, while a nominal lower arm clearance $C_{LN}$ 82 is defined between the actuator arm 28 and a lower data storage disk 24. The upper and lower nominal arm clearance dimensions $C_{UN}$ 80 and $C_{LN}$ 82 represent the maximum allowable upper and lower clearance within which the actuator arm 28 must operate. It can be appreciated that each of the precision components associated with the cooperative operation of an actuator comb 30 and a plurality of data storage disks 24 has associated with it a maximum allowable dimensional tolerance. Further, various tolerance factors associated with component installation and handling must be accounted for when designing the critical dimensions depicted in FIG. 4.

Ideally, a typical data storage system 20 design must account for the cumulative or aggregate effect of these various manufacturing and handling tolerances, which are generally incorporated into a worst case design specification. Although the actuator arm 28 illustrated in FIG. 4 would appear to operate within a relatively large space defined by the nominal upper and lower arm clearance dimensions $C_{UN}$ 80 and $C_{LN}$ 82, accommodating for a worst case operating condition significantly reduces this nominal operating space. In particular, it has been determined that an appreciable percentage of the nominal disk-to-disk spacing DS 70 must be allocated for accommodating these worst case operating conditions. For example, the nominal upper arm clearance dimension $C_{UN}$ 80 is effectively reduced by the budgeted upper arm clearance dimension $C_{UB}$ 72 allocated to accommodate worst case tolerance conditions, thereby effectively reducing the nominal upper arm clearance $C_{UN}$ 80 to a significantly smaller worst case upper arm clearance $C_{UWC}$ 84. It is noted that the cumulative effect of manufacturing and handling tolerances also results in a substantial reduction in the nominal lower arm clearance dimension $C_{LN}$ 82 by an amount corresponding to a budgeted lower arm clearance dimension $C_{LB}$ 74, thereby effectively reducing the nominal lower arm clearance $C_{LN}$ 82 to a significantly smaller worst case lower arm clearance $C_{LWC}$ 86. In order to appreciate the effect of accommodating worst case conditions, one can view the actual design thickness dimension $T_{CA}$ 88 of the actuator arm 28 as effectively being increased to a worst case thickness dimension $T_{WC}$ 90.

In addition to the upper and lower budgeted arm clearance dimensions $C_{UB}$ 72 and $C_{LB}$ 74, an additional upper and lower shock clearance dimension $C_{US}$ 76 and $C_{LS}$ 78 must generally be included to accommodate significant levels of actuator arm 78 deflection due to externally produced, high-magnitude, short-duration shock vibrations impinging on the actuator comb assembly 30. As illustrated in FIG. 4, the nominal disk-to-disk spacing DS 70 provides insufficient axial spacing to accommodate both the worst case upper and lower arm clearance dimensions $C_{UWC}$ 84 and $C_{LWC}$ 86, and the additional space required to accommodate the upper and lower arm shock clearance dimensions $C_{US}$ 76 and 78 $C_{LS}$. By reducing the thickness of the elongated actuator arm 28 in response to reduced disk-to-disk spacing DS 70 dimensions, larger upper and lower budgeted arm clearance dimensions $C_{UB}$ 72 and $C_{LB}$ 74 must generally be provided to accommodate larger deflection variations associated with the thinner and more flexible actuator arm 28.

Figure 5:
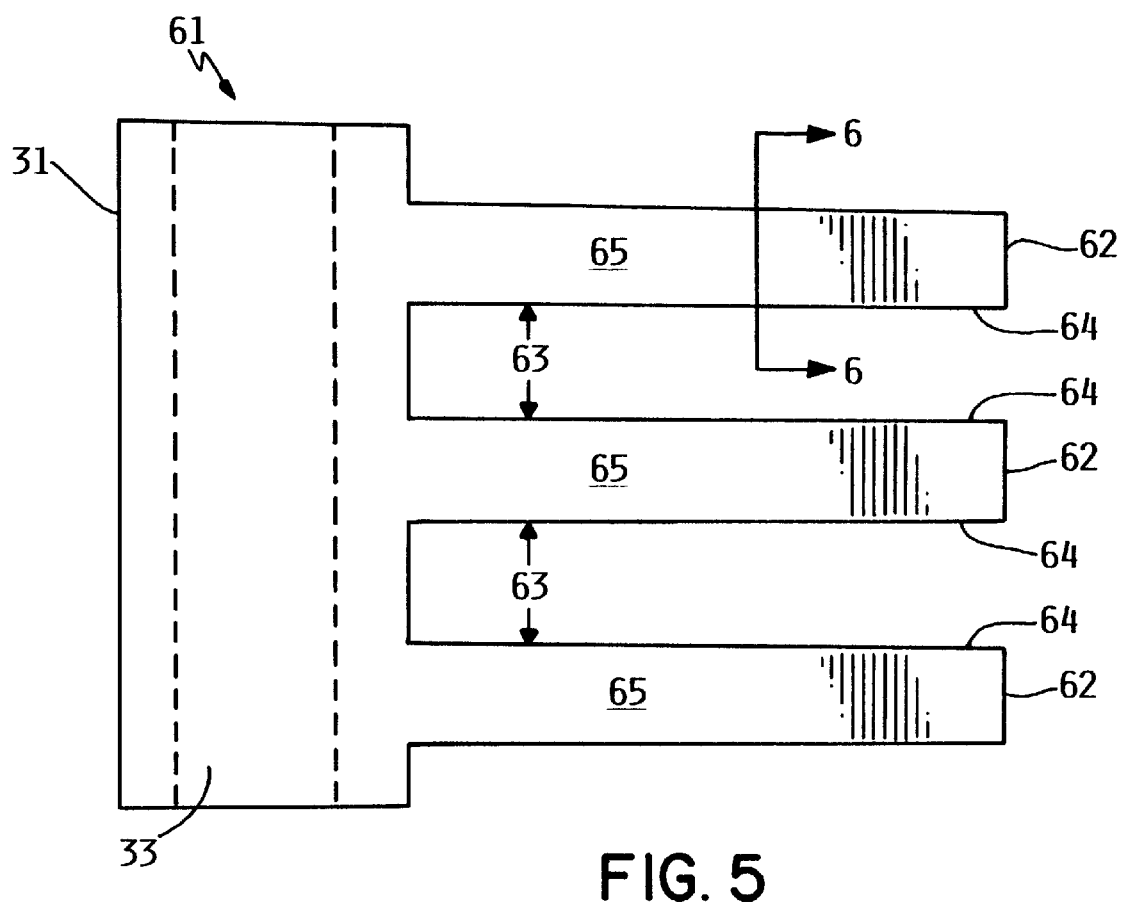
FIG. 5 is a sectional side view of a novel actuator comb assembly including a plurality of composite actuator arms.
Figure 6:
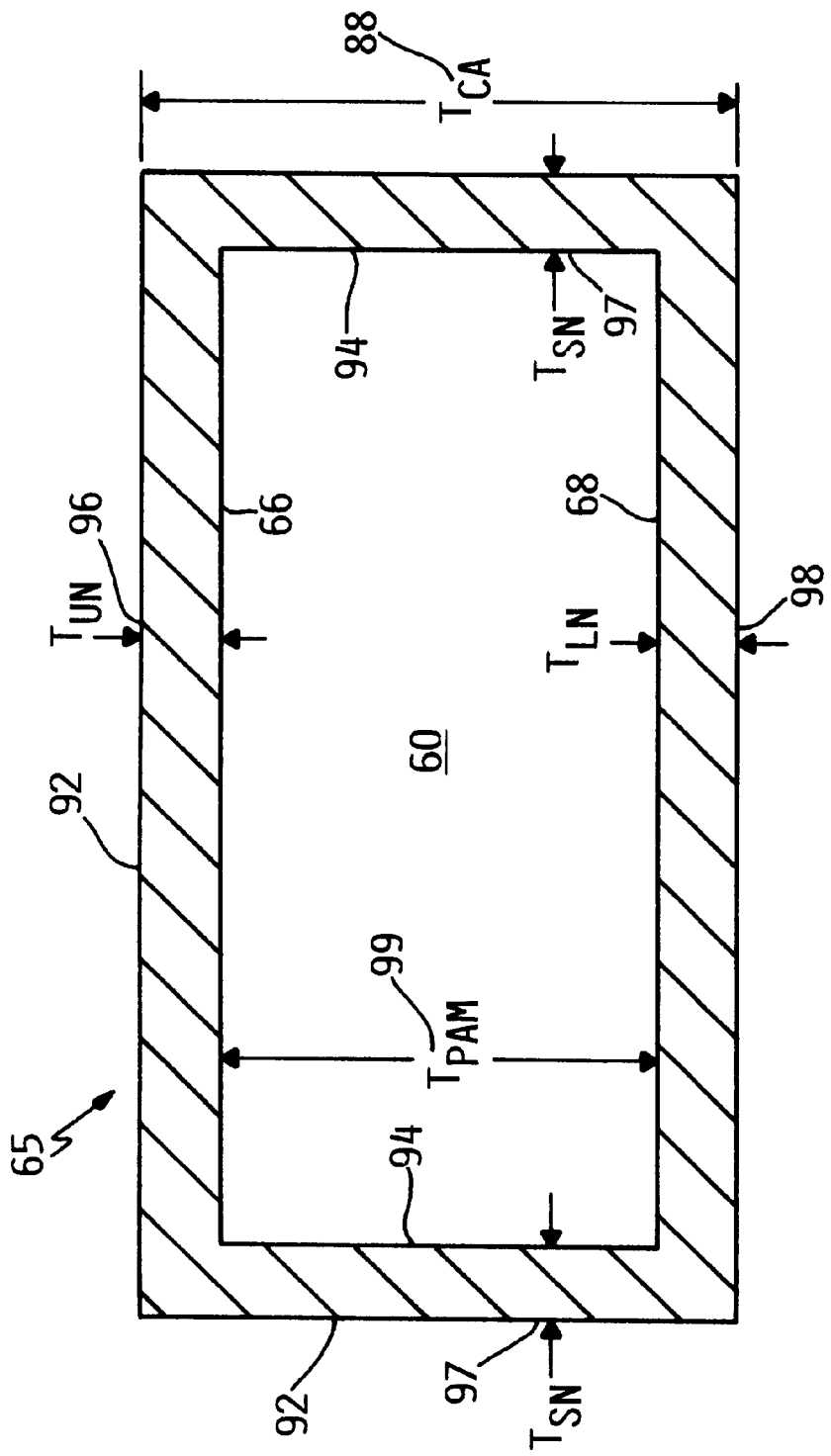
FIG. 6 is an exaggerated sectional view through section 6 of FIG. 5 illustrating a composite actuator arm portion of a novel actuator assembly.

Turning now to FIGS. 5 and 6, the illustrated novel shock-resistant actuator assembly 61 provides for a significant increase in actuator arm 65 rigidity, reduction in disk-to-disk spacing dimensions DS 70, and significantly reduced budgeted upper and lower arm clearance dimensions $C_{UB}$ 72 and $C_{LB}$ 74. More particularly, a novel composite actuator arm 65 structure provides for a significant increase in actuator arm rigidity and enhanced frequency response to high-magnitude, short-duration shock loads, with a sectional thickness significantly smaller than that otherwise required by a conventional unitary metal actuator arm 28.

Referring to FIGS. 5 and 6 in greater detail, there is illustrated an embodiment of a novel shock-resistant actuator comb assembly 61 comprising an actuator body 31 and a plurality of integral composite actuator arms 65. The actuator body 31 preferably includes a central aperture 33 defined therethrough, which is preferably configured to permit rotation of the actuator comb assembly 61 on an actuator shaft 32 mounted to the housing base 22 of the data storage system 20. Each of the integral composite actuator arms 65 includes a distal end 62 having at least one head suspension assembly (HSA) mounting location 64 provided thereon. It is noted that the term HSA as referred to herein is defined as an assembly including at least a load beam 25, slider body assembly 35, and transducer 27, with the load beam 25 preferably being mounted to an HSA mounting location 64 disposed on the distal end 62 of each of the composite actuator arms 65. Between adjacent actuator arm 65, there is defined an arm spacing dimension 63 within which a portion of a data storage disk 24 rotates generally at a relatively high rate of rotation during normal data storage system 20 operation. It is noted that the dimensional considerations discussed previously with respect to FIG. 4 are generally applicable to the design and operation of a novel comb assembly 61 illustrated in FIG. 5.

In FIG. 6, there is illustrated a cross-sectional view of a novel composite actuator arm 65 illustrated in FIG. 5. In one embodiment, the novel composite actuator arm 65 includes a primary arm member 60, fabricated from the first type of metal, and a plating of a second metal deposited on at least the upper and lower primary arm member surfaces 66 and 68, respectively. In another embodiment, the opposing side surfaces 94 also include plating of the second type of metal. In a preferred embodiment, the primary arm member 60 is fabricated from aluminum, and the plating deposited on the upper, lower, and side surfaces 66, 68, and 94 of the primary arm member 60 is preferably nickel plating. For purposes of explanation, the total cross-sectional thickness of the novel composite actuator arm 65 is depicted as the dimension $T_{CA}$ 88, while the primary arm member 60 thickness is depicted as the dimension $T_{PAM}$ 99 and the upper, lower, and side surface plating dimensions as $T_{UN}$ 96, $T_{LN}$ 98, and $T_{SN}$ 97, respectively. It has been determined by the inventors that the novel composite actuator arm 65 provides for a significantly higher sectional modulus and stiffness in comparison to a conventional aluminum or magnesium unitary actuator arm 28 having an equivalent or even greater cross-sectional thickness.

It is noted that depositing a relatively thin layer of protective metal, typically on the order of less than 10 microns, on an actuator comb 30 is known. One conventional method for fabricating an actuator comb assembly 30 is accomplished using conventional die casting fabrication techniques. Such die cast actuator combs 30 are often plated with a protective metal, such as nickel, to a thickness of less than 10 microns to prevent the porous die castings from out-gassing and shedding particulate contaminants which could otherwise interfere with the reliable operation of the data storage system 20. It is to be understood, however, that nickel plating thicknesses of less than 10 microns provide no detectable stiffening effect. It is to be further understood that conventional nickel-plating of actuator combs 30 provide for contamination containment through the use of a flash-coating of nickel which accounts for only about one percent of the thickness of each side of a conventional actuator arm 28, and, accordingly, provides no detectable enhancement to the rigidity and frequency response characteristics of conventional actuator arms 28.

Figure 7:
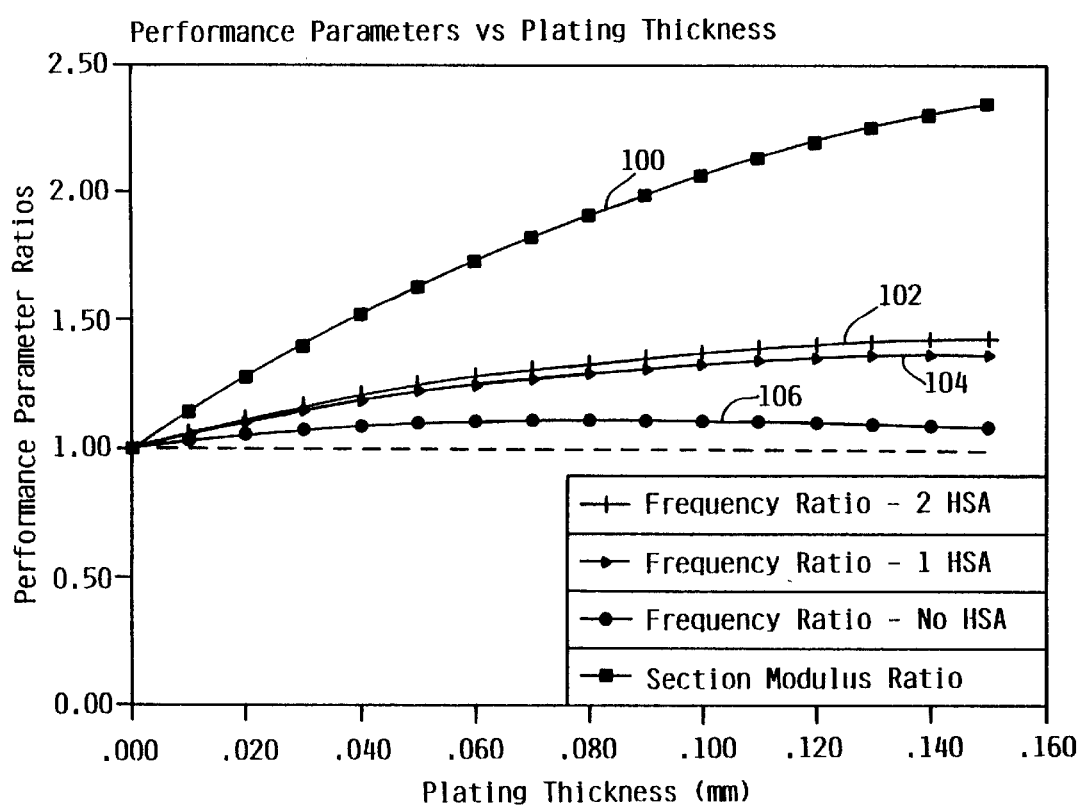
FIG. 7 is a graphical illustration of various performance parameters associated with the composite actuator arm portion of a novel actuator assembly.

The advantageous performance characteristics of the novel composite actuator arm 65 are illustrated in graphical form in FIG. 7. The values illustrated along the X-axis represent ratios of various performance parameters associated with a novel composite actuator arm 65 relative to corresponding performance parameters associated with a unitary aluminum actuator arm 28 of equivalent thickness. It is noted that computer modeling was employed to develop the graphical data illustrated in FIG. 7 for a composite actuator arm 61 including a primary arm member 60 having a cross-sectional thickness of approximately 0.6 mm. Subsequent finite element method computer modeling produced substantially the same performance parameter values. As indicated by the curve 100, the section modulus of the composite actuator arm increases rapidly as the thickness of the nickel plating 92 deposited on the aluminum primary arm member 60 increases. It can be seen that depositing nickel plating 92 to a thickness of approximately 90 microns, relative to a total actuator arm 65 thickness of approximately 600 microns (0.6 mm), effectively doubles the section modulus and stiffness of the composite actuator arm 65 in comparison to a conventional unitary aluminum actuator arm 28 of equivalent thickness (690 microns).

The frequency ratio curves 102, 104, and 106 illustrate the performance characteristics of a composite actuator arm 65 at various nickel plating 92 thicknesses in responding to high-magnitude, short-duration, non-operational shock loads. The frequency ratio curve 102 illustrates the response of a composite actuator arm 65 having two head suspension assemblies (HSAs) mounted to corresponding HSA mounting locations 64 disposed on the distal end 62 of the actuator arm 65. The frequency ratio curve 104 illustrates the response of a composite actuator arm 65 to short-duration non-operational shock loads when one HSA is mounted to an HSA mounting location 64 disposed on the distal end 62 of the actuator arm 65. Finally, the frequency ratio curve 106 illustrates the response of a composite actuator arm 65 to non-operational shock loads when no HSA is disposed on the distal end 62 of the actuator arm 65.

It can be seen from the frequency ratio curves 102 and 104, which are of particular importance, that a 28% and 34% improvement in non-operational shock loading response is realized for a composite actuator arm 65 loaded with one and two HSAs, respectively, at a nickel plating 92 thickness of approximately 80 microns. Thus, by depositing an 80 micron nickel plating 92 on the 0.6 mm primary arm member 60 which increases the net thickness of the composite actuator arm 65 by approximately 13%, a 28% and 34% improvement in shock resistance is realized for a composite actuator arm 65 loaded respectively with one HSA and two HSAs. It is to be understood that these results are extendable to composite actuator arms 65 with primary arm members 60 having thicknesses other than 0.6 mm, and that thicker primary arm members 60 will generally require a correspondingly thicker plating 92 of nickel to achieve similar results.

Relating the graphical data of FIG. 7 to the cross-sectional view of a novel composite actuator arm 65 shown in FIG. 6, enhanced composite actuator arm 65 stiffness and frequency response characteristics generally result with nickel plating 92 thicknesses of at least 20 microns disposed on each of the upper and lower primary arm surfaces 66 and 68, respectively. It is to be understood that the graphical data illustrated in FIG. 7 was obtained by modeling an actuator arm 65 having a length of approximately 32 mm and a primary arm member 60 thickness of approximately 0.6 mm. Accordingly, the minimum nickel plating 92 thickness required to obtain beneficial levels of enhanced actuator arm 65 stiffness and frequency response will vary for actuator arms 65 having varying length and cross-sectional thickness dimensions.

Figure 8:
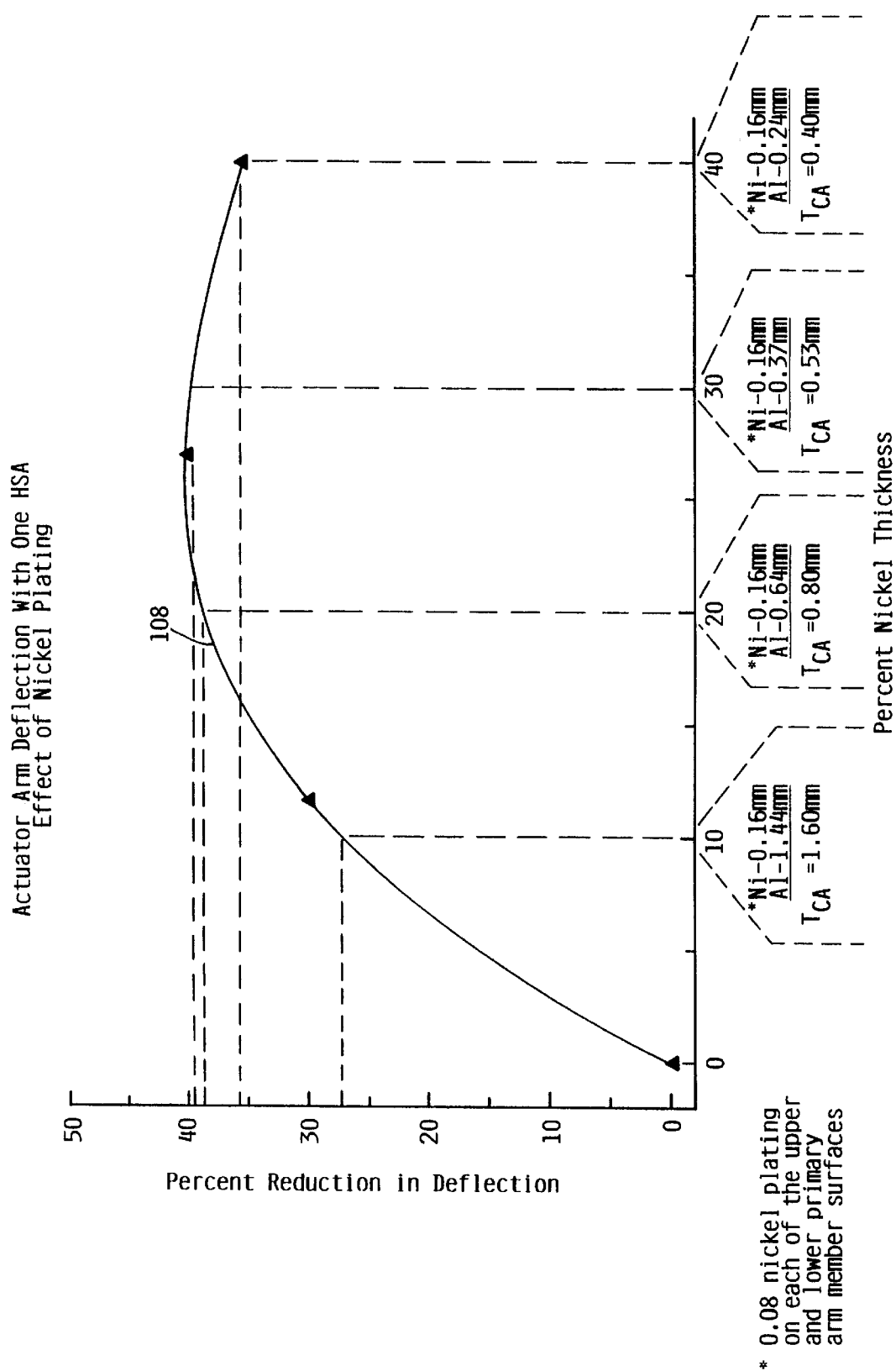
FIG. 8 is a graphical showing of the percent reduction in actuator arm deflection associated with a novel composite actuator arm comprising a nickel plating thickness of 80 microns and varying thicknesses of an aluminum primary arm member.

The advantages associated with a novel composite actuator arm 65 are further illustrated in FIG. 8. The percent reduction in composite actuator arm 65 deflection (Y-axis) is plotted as a function of varying nickel plating 92 percentage of total composite actuator arm 65 thickness (X-axis). The data represented by the curve 108 was produced using finite element method modeling of a composite actuator arm 65 loaded with one HSA, and having a varying aluminum primary arm member 65 thickness and a constant 80 micron thickness of nickel plating 92 on each of the upper and lower primary arm member surfaces 66 and 68, respectively. It is noted that a 100 g, 2 milisecond shock event was simulated to excite the composite actuator arm 65. The graphical illustration of FIG. 8 clearly demonstrates the significant levels of reduced actuator arm deflection realized by employment of a novel composite actuator arm 65.

A composite actuator arm 65 loaded with one HSA and comprising 10 percent nickel and 90 percent aluminum, for example, provides for a 28 percent reduction in actuator arm deflection relative to a conventional unitary actuator arm 28 fabricated exclusively from aluminum of an equivalent thickness (i.e., 1.60 mm). At this ratio of nickel to aluminum, the thickness of the primary arm member 65 is 1.44 mm and the nickel plating thickness is held constant at 0.08 mm respectively on the upper and lower primary arm member surfaces 66 and 68, for a total nickel plating thickness of 0.16 mm and a total composite actuator arm 65 thickness $T_{CA}$ 88 of 1.60 mm.

At a ratio of 20 percent nickel to 80 percent aluminum, a composite actuator arm 65 having such a composition provides for a 38 percent reduction in actuator arm deflection relative to a conventional unitary actuator arm 28 fabricated exclusively from aluminum of an equivalent thickness. At this ratio of nickel to aluminum, the thickness of the primary arm member 65 is 0.64 mm and the nickel plating thickness is held constant at 0.08 mm respectively on the upper and lower primary arm member surfaces 66 and 68, for a total nickel plating thickness of 0.16 mm and a total composite actuator arm 65 thickness $T_{CA}$ 88 of 0.80 mm.

By way of further example, at a ratio of 30 percent nickel to 70 percent aluminum, a composite actuator arm 65 having such a composition provides for nearly a 40 percent reduction in actuator arm deflection relative to a conventional unitary actuator arm 28 fabricated exclusively from aluminum of an equivalent thickness. At this ratio of nickel to aluminum, the thickness of the primary arm member 65 is 0.37 mm and the nickel plating thickness is held constant at 0.08 mm respectively on the upper and lower primary arm member surfaces 66 and 68, for a total nickel plating thickness of 0.16 mm and a total composite actuator arm 65 thickness $T_{CA}$ 88 of 0.53 mm.

As a final example, a composite actuator arm 65 having a composition of 40 percent nickel and 60 percent aluminum provides for nearly a 36 percent reduction in actuator arm deflection relative to a conventional unitary actuator arm 28 fabricated exclusively from aluminum of an equivalent thickness. At this ratio of nickel to aluminum, the thickness of the primary arm member 65 is 0.24 mm and the nickel plating thickness is held constant at 0.08 mm respectively on the upper and lower primary arm member surfaces 66 and 68, for a total nickel plating thickness of 0.16 mm and a total composite actuator arm 65 thickness $T_{CA}$ 88 of 0.40 mm.

In one embodiment, for example, a highly compact data storage system 20 having a 3.5" form factor includes a plurality of data storage disks 24 with disk-to-disk separation distances DS 70 of approximately 1.4 mm. In such a configuration, a total actuator arm 65 cross-sectional thickness $T_{CA}$ 88 of approximately 0.6 mm is suitable in view of the various cumulative worst case manufacturing tolerances discussed previously hereinabove, which must be accounted for when properly designing an actuator comb 31. In one embodiment, a composite actuator arm 65 having a total thickness $T_{CA}$ 88 of approximately 0.6 mm preferably comprises a primary arm member 60 having a cross-sectional thickness $T_{PAM}$ 99 of approximately 0.44 mm and a plating 92 thickness of approximately 0.08 mm deposited on each of the upper and lower primary arm member surfaces 66 and 68, respectively. As such, the cross-section of a 0.6 mm thick composite actuator arm 65 comprises approximately 0.16 mm of nickel plating 92 thickness cumulatively deposited on a primary arm member 60, preferably fabricated from aluminum, of approximately 0.44 mm in thickness. In accordance with this embodiment, the novel composite actuator arm 65 includes approximately 73% aluminum and 27% nickel.

Extrapolating these dimensions and percentages to data storage systems 20 having form factors other than a 3.5" form factor, such as 1.8" and 2.5" form factors, the length of a composite actuator arm 65 for use in such data storage systems 20 typically range between approximately 8 mm and approximately 32 mm, with corresponding cross-sectional composite actuator arm 65 thickness dimensions ranging between approximately 0.4 mm and approximately 2.0 mm. Depending on the configuration of a particular data storage system 20, a composite actuator arm 65 may include nickel plating 92 comprising between approximately 5% and approximately 40% of the total composite actuator arm 65 thickness $T_{CA}$ 88.

In another embodiment, the thickness $T_{UN}$ 96 of the nickel plating 92 deposited on the upper primary arm surface 66 differs from the thickness dimension $T_{LN}$ 98 of the nickel plating 92 deposited on the lower primary arm member surface 68. This nickel plating thickness differential is preferably at least 10 microns, but may differ according to the specific configuration of a particular composite actuator arm 65. Employment of differential nickel plating thicknesses may be advantageous when fine-tuning the design of composite actuator arms 64 having varying configuration, mass, and HSA assembly loading specifications.

Figure 9:
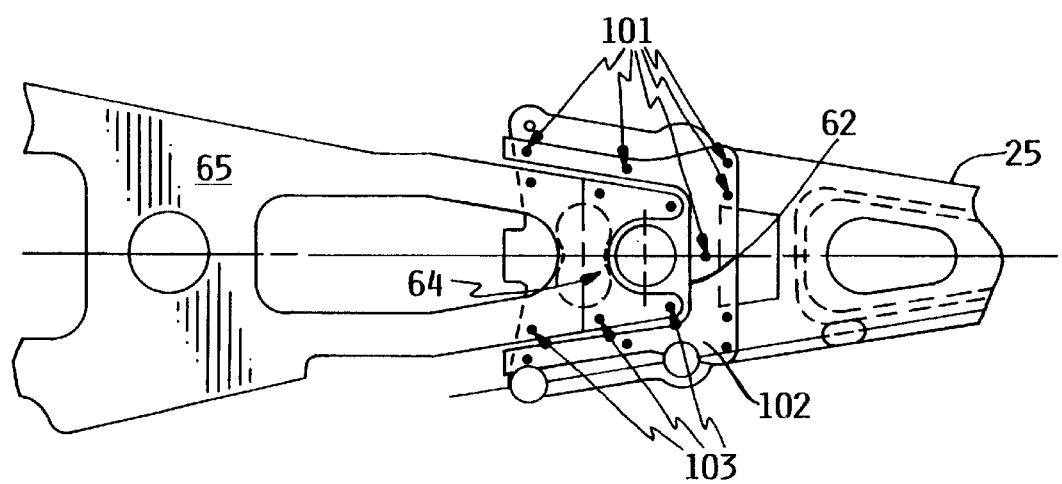
FIG. 9 is a top plan view of a novel composite actuator arm, with a head suspension assembly mounted thereon preferably by means of laser welding.

Turning now to FIG. 9, there is illustrated a partial top plan view of a novel composite actuator arm 65 to which is mounted a load beam 25 of an HSA. An important advantage of the novel nickel-plated shock-resistant actuator comb 61 concerns an efficient method by which an HSA can be mounted to the HSA mounting location 64 of a composite actuator arm 65. In the embodiment illustrated in FIG. 9, a mounting plate 102 is employed to stiffen the load beam 25 of an HSA prior to attaching the load beam 25 to the HSA mounting location 64 disposed on the distal end 62 of the actuator arm 65. During the actuator comb 61 build process, the mounting plate 102 is initially laser welded to the load beam 25 at a plurality of weld points 101. The load beam 25, typically fabricated from stainless steel, is then held in proximity to the HSA mounting location 64 on the distal end 62 of an actuator arm 64 by means of an appropriate fixture. After positioning the load beam 25 into the appropriate configuration, as shown in FIG. 9, laser welding is performed at a plurality of weld points 103 to securely mount the HSA to the actuator arm 65.

The nickel plating 92 disposed on the primary arm member 60 of the composite actuator arm 65 permits an HSA to be laser welded to the actuator arm 65 of an actuator comb assembly 61, which would otherwise typically be mounted using a conventional ball swaging mounting process. Laser welding is a fast, inexpensive, and reliable method of securely coupling compatible materials. Utilization of laser welding is also desirable since it minimizes material thicknesses that would otherwise require an increase in the disk-to-disk spacing DS 70. It is understood that a conventional ball swaging mounting process requires the addition of a boss disposed on the mounting plate 102 which is then ball swaged into a hole provided on the distal end 62 of the actuator arm 65. The mounting plate 102, termed a swage plate when used in conjunction with a ball swaging mounting process, must generally be increased in its thickness dimension to include the additional boss arrangement, which requires an increase in the disk-to-disk spacing DS 70 to accommodate the additional swage plate thickness. In accordance with a laser welding process, no such additional boss arrangement is required. The elimination of a boss arrangement substantially reduces the mass at the HSA mounting interface and the magnitude of actuator arm deflection, thus permitting employment of significantly thinner actuator arms relative to conventional unitary metal actuator arms.

In one embodiment, attachment of the load beam 25 of an HSA to an HSA mounting location 64 is preferably accomplished using a laser welding device having its laser beam oriented at an angle of incidence with respect to a longitudinal axis defined by the central aperture 33 of the novel actuator comb 61. Depending on the arm spacing dimension 63 between adjacent composite actuator arms 65, the location of the weld points 103, the frequency and power of the laser beam, as well as other characteristics of the laser welding device, varying angles of laser beam incidence may be satisfactory. Generally, typical angles of incidence range between 20 and 45 degrees relative to the longitudinal axis defined by the central aperture 33 of the novel actuator comb 61. Off-axis, angled laser welding permits efficient and effective welding of a plurality of HSAs to a plurality of HSA mounting locations 64 for an actuator comb 61 having relatively small arm spacing dimensions 63.

To ensure reliable attachment of one or more HSAs to a novel composite actuator arm 65, it is believed that nickel plating 92 thicknesses on the order of 40 to 80 microns is desirable, although reliable coupling may be accomplished at nickel plating 92 thicknesses smaller than 40 microns. It may further be desirable to match the thickness of the nickel plating 92 to the thickness of the mounting plate 102. It is to be understood, however, that the advantages provided by a novel composite actuator arm 65 having nickel plating 92 thicknesses smaller than 40 to 80 microns may be realized when employing a conventional ball swaging mounting technique.

It will, of course, be understood that various modifications and additions can be made to the embodiments discussed hereinabove without departing from the scope or spirit of the present invention. For example, the novel actuator comb 61 is preferably fabricated from aluminum, but may also be fabricated from magnesium or another relatively low-cost metal amenable to conventional extrusion or die casting fabrication techniques. Plating materials other than nickel metal may also be employed for stiffening the primary arm member 60 of the composite actuator arm 65. Also, the dimensions and configuration of the composite actuator arm 65 and actuator comb 61 illustrated in the Figures may vary depending on the particular configuration and specifications of a specific data storage system 20, and may vary depending on a number of parameters including the length of the actuator arm 65, disk-to-disk spacing dimension DS 70, number of data storage disks 24, number of HSAs disposed on each of the actuator arms 65, expected level of operational and non-operational shock loads, fabrication materials, and expected manufacturing and handling tolerances, among others.

Also, mounting of an HSA to an actuator arm 65 may be accomplished by attachment means other than by laser welding, such as use of an appropriate adhesive material. Further, the novel shock-resistant actuator assembly 61 may be installed in data storage systems 20 having varying form factors, such as those with data storage disks having diameters of 8", 5.25", 3.5", 2.5", and 1.8". Accordingly, the scope of the present invention should not be limited to the particular embodiments discussed above, but should be defined only by the claims set forth below and equivalents of the disclosed embodiments.

What is claimed is:

1. A method of manufacturing an actuator assembly, comprising:

providing an actuator assembly comprising a plurality of composite actuator arms, each of the composite actuator arms manufactured by:

forming a primary actuator arm member from a first type of metal, the primary actuator arm member comprising an upper surface and a lower surface; and stiffening the primary actuator arm member by forming a plating of a second type of metal having a thickness ranging from about 20 microns to about 140 microns on each of the upper and lower surfaces of the primary actuator arm member;

providing a plurality of head suspension assemblies each including a load beam; and laser welding the load beams of the plurality of head suspension assemblies to a mounting location proximate a distal end of each composite actuator arm.

2. The method according to claim 1, wherein each of the composite actuator arms has a length ranging between about 8 millimeters and about 32 millimeters, and a total thickness ranging between about 0.4 millimeters and about 2.0 millimeters.

3. The method according to claim 1, wherein forming the plating of the second type of metal includes forming a nickel plating.

4. The method according to claim 1, wherein forming the plating includes forming the plating such that the thickness of the plating disposed on either one of the upper and lower surfaces of the primary actuator arm member differs by at least 5 microns from the thickness of the plating disposed on the other one of the upper and lower surfaces of the primary arm member.

5. The method according to claim 1, wherein forming the plating includes forming the plating such that the thickness of the plating comprises between about 10 percent and about 40 percent of a total composite actuator arm thickness.

6. The method according to claim 1, wherein forming the primary arm member from the first type of metal includes forming the primary arm member from a metal that comprises substantially aluminum.

7. A method as claimed in claim 1, wherein the step of laser welding includes the further step of laser welding the load beams of the plurality of head suspension assemblies to the mounting location of each of the plurality of composite actuator arms at an angle of incidence ranging between 30 and 45 degrees with respect to a longitudinal axis defining the actuator assembly.

8. A method as claimed in claim 1, wherein the step of laser welding includes the further step of laser welding a mounting plate to each of the load beams.

9. A method of manufacturing an actuator assembly, comprising:

providing an actuator assembly comprising a plurality of composite actuator arms, each of the composite actuator arms manufactured by:
- forming a primary actuator arm member from a first type of metal, the primary actuator arm member comprising an upper surface and a lower surface; and
- stiffening the primary actuator arm member by forming a plating of a second type of metal having a thickness ranging from about 20 microns to about 140 microns on each of the upper and lower surfaces of the primary actuator arm member; and attaching a head suspension assembly comprising a load beam at a mounting location proximate a distal end of each composite actuator arm.

10. The method according to claim 9, wherein each of the composite actuator arms has a length ranging between about 8 millimeters and about 32 millimeters, and a total thickness ranging between about 0.4 millimeters and about 2.0 millimeters.

11. The method according to claim 9, wherein forming the plating of the second type of metal includes forming a nickel plating.

12. The method according to claim 9, wherein forming the plating includes forming the plating such that the thickness of the plating disposed on either one of the upper and lower surfaces of the primary actuator arm member differs by at least 5 microns from the thickness of the plating disposed on the other one of the upper and lower surfaces of the primary arm member.

13. The method according to claim 9, wherein forming the plating includes forming the plating such that the thickness of the plating comprises between about 10 percent and about 40 percent of a total composite actuator arm thickness.

14. The method according to claim 9, wherein forming the primary arm member from the first type of metal includes forming the primary arm member from a metal that comprises substantially aluminum.

15. A method as claimed in claim 9, wherein attaching a head suspension assembly comprises laser welding the load beam of each head suspension assembly to the mounting location of the respective composite actuator arm.

16. A method as claimed in claim 15, wherein the step of laser welding includes the further step of laser welding the load beam to the mounting location of each composite actuator arm at an angle of incidence ranging between about 30 degrees and about 45 degrees with respect to a longitudinal axis defining the actuator assembly.

17. A method as claimed in claim 15, wherein the step of laser welding includes the further step of laser welding a mounting plate to each of the load beams.

18. A method of manufacturing an actuator assembly, comprising:

providing an actuator assembly comprising a plurality of composite actuator arms, each of the composite actuator arms manufactured by:
- forming a primary actuator arm member from a metal comprising aluminum, the primary actuator arm member comprising an upper surface and a lower surface; and
- stiffening the primary actuator arm member by forming a plating comprising nickel having a thickness ranging from about 20 microns to about 140 microns on each of the upper and lower surfaces of the primary actuator arm member;

providing a plurality of head suspension assemblies each including a load beam; and laser welding the load beams of the plurality of head suspension assemblies to a mounting location proximate a distal end of each composite actuator arm.

19. The method according to claim 18, wherein each of the composite actuator arms has a length ranging between about 8 millimeters and about 32 millimeters, and a total thickness ranging between about 0.4 millimeters and about 2.0 millimeters.

20. The method according to claim 18, wherein forming the plating includes forming the plating such that the thickness of the plating disposed on either one of the upper and lower surfaces of the primary actuator arm member differs by at least 5 microns from the thickness of the plating disposed on the other one of the upper and lower surfaces of the primary arm member.

21. The method according to claim 18, wherein forming the plating includes forming the plating such that the thickness of the plating comprises between about 10 percent and about 40 percent of a total composite actuator arm thickness.

22. A method as claimed in claim 18, wherein the step of laser welding includes the further step of laser welding the load beams of the plurality of head suspension assemblies to the mounting location of each of the plurality of composite actuator arms at an angle of incidence ranging between 30 and 45 degrees with respect to a longitudinal axis defining the actuator assembly.

23. A method as claimed in claim 18, wherein the step of laser welding includes the further step of laser welding a mounting plate to each of the load beams.

* * * * *